(12) United States Patent
Gargiulo et al.

(10) Patent No.: US 7,555,537 B2
(45) Date of Patent: Jun. 30, 2009

(54) DOWNLOADABLE MULTIMEDIA CONTENT AND METHOD FOR ACCOUNTING

(75) Inventors: Michael Gargiulo, Bedford, TX (US); Justin Robert Beghtol, Huntington Beach, CA (US)

(73) Assignee: Nokia Mobile Phones Ltd., Espoo (FI)

( * ) Notice: Subject to any disclaimer, the term of this patent is extended or adjusted under 35 U.S.C. 154(b) by 610 days.

(21) Appl. No.: 09/746,270

(22) Filed: Dec. 20, 2000

(65) Prior Publication Data

US 2002/0087656 A1 Jul. 4, 2002

Related U.S. Application Data

(60) Provisional application No. 60/243,111, filed on Oct. 25, 2000.

(51) Int. Cl.
G06F 15/16 (2006.01)
G06F 7/00 (2006.01)
H04M 3/00 (2006.01)

(52) U.S. Cl. ............... 709/219; 200/203; 200/232; 707/1; 455/419

(58) Field of Classification Search ............... 709/203, 709/217, 218, 219, 200, 232; 705/14, 26, 705/30, 35, 75; 455/419; 707/1
See application file for complete search history.

(56) References Cited

U.S. PATENT DOCUMENTS

| | | | |
|---|---|---|---|
| 4,640,986 A | 2/1987 | Yotsutani et al. | |
| 4,868,561 A | 9/1989 | Davis | |
| 5,414,751 A | 5/1995 | Yamada | |
| 5,452,354 A | 9/1995 | Kyronlahti et al. | |
| 5,689,560 A * | 11/1997 | Cooper et al. | 705/52 |
| 5,887,266 A | 3/1999 | Heinonen et al. | |
| 5,905,736 A * | 5/1999 | Ronen et al. | 370/546 |
| 5,909,492 A * | 6/1999 | Payne et al. | 705/78 |
| 5,915,021 A | 6/1999 | Herlin et al. | |
| 5,930,026 A | 7/1999 | Jacobson et al. | |
| 5,948,061 A * | 9/1999 | Merriman et al. | 709/219 |
| 5,960,411 A * | 9/1999 | Hartman et al. | 705/26 |
| 5,961,804 A | 10/1999 | Jacobson et al. | |
| 6,017,584 A | 1/2000 | Albert et al. | |
| 6,023,689 A | 2/2000 | Herlin et al. | |

(Continued)

FOREIGN PATENT DOCUMENTS

EP 0 851 649 7/1998

(Continued)

OTHER PUBLICATIONS

Colkin, E.; "Wireless Ads: Effective or Intrusive?";http://www.techweb.com/wire/story/TWB20001218S0012; Dec. 18, 2000.

(Continued)

*Primary Examiner*—Philip C Lee
(74) *Attorney, Agent, or Firm*—Alston & Bird LLP

(57) ABSTRACT

A novel system to deliver and reproduce personalizing ringing tune data or other such multimedia content to a wireless handset's browser is provided. Additionally, a novel system is provided that allows a consumer to preview the multimedia content (e.g. ring tune, bit-map) and either approve or decline being billed for the particular multimedia message content.

27 Claims, 7 Drawing Sheets

U.S. PATENT DOCUMENTS

| | | | |
|---|---|---|---|
| 6,047,051 A | | 4/2000 | Ginzboorg et al. |
| 6,047,268 A | * | 4/2000 | Bartoli et al. ............... 705/35 |
| 6,058,375 A | * | 5/2000 | Park ........................ 705/30 |
| 6,072,716 A | | 6/2000 | Jacobson et al. |
| 6,078,806 A | | 6/2000 | Heinonen et al. |
| 6,078,820 A | | 6/2000 | Wells et al. |
| 6,085,100 A | | 7/2000 | Tarnanen |
| 6,094,587 A | | 7/2000 | Armanto et al. |
| 6,118,426 A | | 9/2000 | Albert et al. |
| 6,120,588 A | | 9/2000 | Jacobson |
| 6,120,839 A | | 9/2000 | Comiskey et al. |
| 6,125,281 A | | 9/2000 | Wells et al. |
| 6,130,773 A | | 10/2000 | Jacobson et al. |
| 6,151,507 A | | 11/2000 | Laiho et al. |
| 6,157,377 A | * | 12/2000 | Shah-Nazaroff et al. .... 345/719 |
| 6,163,711 A | | 12/2000 | Juntunen et al. |
| 6,216,112 B1 | * | 4/2001 | Fuller et al. ................ 705/14 |
| 6,647,260 B2 | * | 11/2003 | Dusse et al. ............... 455/419 |
| 2002/0013167 A1 | * | 1/2002 | Spaur et al. ................ 463/11 |
| 2002/0049717 A1 | * | 4/2002 | Routtenberg et al. ........... 707/1 |
| 2002/0059363 A1 | * | 5/2002 | Katz et al. ................ 709/203 |
| 2003/0036974 A1 | * | 2/2003 | Allen ..................... 705/27 |
| 2004/0160911 A1 | * | 8/2004 | Zilliacus et al. ............ 370/328 |

FOREIGN PATENT DOCUMENTS

| | | |
|---|---|---|
| EP | 1 043 906 | 10/2000 |
| JP | 2000-134332 | 5/2000 |
| JP | 2001-350479 | 12/2001 |
| JP | 2002-073053 | 3/2002 |
| WO | WO 96/06417 | 2/1996 |
| WO | WO 96/06508 | 2/1996 |
| WO | WO 97/40615 | 10/1997 |
| WO | WO 98/56202 | 12/1998 |
| WO | WO 99/34639 | 7/1999 |
| WO | WO 00/28746 | 5/2000 |
| WO | WO 00 36857 | 6/2000 |
| WO | WO 00/57617 | 9/2000 |

OTHER PUBLICATIONS

"yourmobile"; http://www.yourmobile.com/customer_support/help_home.asp?userguid+&usertype=0; Oct. 24, 2000.

M. Nilsson: "ID3 tag version 2.3.0" Informal Standard, (Online) Feb. 3, 1999, XP992236792 Retrieved from the Internet: <URL: http://www.id3.org/id3v2.3.0 txt> [retrieved on Apr. 1, 2003].

Stevens, W. Richard: "TCP/IP Illustrated: the protocols" 1994, Addison Wesley XP002236793 ISBN 0201633469; pp. 191-194.

"Nokia Multimedia Messaging: As SMS Evolves to Mobile Multimedia, Profitable Opportunities Abound," White Paper, 1999, 12 pages, Nokia, Finland.

Sippola, J., "Tone Task Specification," Feb. 1, 1996, 41 pages, Version 10-0, Nokia Mobile Phones.

* cited by examiner

DOWNLOADABLE MULTIMEDIA CONTENT AND METHOD FOR ACCOUNTING

CROSS REFERENCE TO RELATED APPLICATIONS

This application is related to and claims priority of Provisional Application No. 60/243,111 filed on Oct. 25, 2000.

FIELD OF THE INVENTION

This invention relates generally to methods and systems for delivering and accounting for multimedia content.

BACKGROUND OF THE INVENTION

Mobile phones (also known as mobile stations and personal trusted devices) have originally had ring tones similar to ordinary telephones. This caused a problem when two users in the same space had the same ring tone—causing confusion as to which mobile station is ringing. This problem has been solved as mobile phones became more advanced. Currently, mobile phones have several pre-stored ring tones from amongst which a user may select a preferred ring tone. In addition to ordinary ringing tones, melodies from familiar pieces of music have been implemented as ring tones and may be amongst the ring tones from which to choose. Ringing tones may also be referred as ring tunes, especially if in the form of a melody. With the increase use of mobile phones, there is still a possibility of the same user in the same space using the same ring tune.

Programming a telephone's ringing tone has been taught in U.S. Pat. No. 6,094,587 issued to Armanto et al. on Jul. 25, 2000, assigned to assignee of the present invention, which is incorporated herein by reference. In Armanto et al., the ring tone is sent to a mobile station in the form of a ring-tone message including an identifier identifying the message as a ring tone. Upon reception, the ring-tone message is identified on basis of the ring-tone message identifier. The ring-tone message is then modified into a suitable form for a ring-tone generator and memory. The ring tone may be sent as characters in a short message such as Short Message Service (SMS), Unstructured Supplementary Service Data (USSD), or by means of an off-line infrared link, e.g., of Inferred Data association (IrDa) type.

Short message service (SMS) is an example of message communication in mobile networks—specifically in GSM networks. SMS differs from speech and data services in that to send a short message, a connection from the sender to the receiver need not be established, since short messages are transmitted through signaling on control or signaling channels in digital mobile networks.

This situation does not provide the capabilities for a consumer to browse a selection of ring tones. Furthermore, each SMS or the like message may result in a charge to the consumer, even if the ring tone does not suit the consumer. Examples of message billing are provided by International Application Number PCT/FI99/00935, published on May 18, 2000, assigned Publication Number WO 00/28746 entitled MESSAGE COMMUNICATION CHARGING (assigned U.S. Ser. No. 09/850,036 and International Application Number PCT/FI98/00474, published on Dec. 10, 1998, assigned Publication Number WO 98/56202 entitled BILLING MOBILE TERMINATED SHORT MESSAGES (assigned U.S. Ser. No. 09/545,119). All the patent applications are assigned to related entities of the assignee of the present invention and are incorporated herein by reference.

There are currently websites from which a consumer may receive instructions and text which will allow them to manually program a tune into a mobile station or send ring tones to Nokia brand mobile stations. Examples of such sites are Club Nokia and YourMobile. This requires the user to have access to a personal computer (PC) or other World-Wide-Web (WWW) surfing device using browsers that support basic industry standards such as Hypertext Transfer Protocol (HTTP) and Hypertext Mark-up Language (HTML). Such WWW sites have been designed for desktop PCs and faster connections and do not function well in narrow bandwidth and limited screen size devices.

Recent advancements in web protocols have resulted in the creation of the Wireless Application Protocol (WAP). WAP solutions using Handheld Device Markup Language (HDML) or Wireless Markup Language (WML) allow web content to be adapted for use on narrow bandwidth and limited screen size handheld devices such as mobile stations. Mobile station manufacturers are embedding high-value added applications such as WAP compliant microbrowsers in their mobile stations that allow the mobile stations to function as a client for services and content from the Internet through a wireless portal. Microbrowsers may be logic in the form of software or firmware embedded in the end user device that enables the device to interact with a gateway on a network. Examples of microbrowsers are the Nokia Microbrowser, herein incorporated by reference and UP.Browser from Openwave, previously known as Phone.com (Redwood City, Calif.). A style guide for HDML may also be obtained from Openwave and other sources and is incorporated herein by reference.

A wireless portal or gateway is the point of entry through which the user accesses Internet content and services. The portal may send content and/or services to the user (referred to as PUSH) or the user may request content or services from the portal provider (referred to as PULL). An example of such a portal would be the Nokia Artus MAX Platform (Nokia Corporation; Irving, Tex.)

Information on WAP can be obtained at the Wapforum or *Understanding WAP; Wireless Applications, Devices, and Services*; ISBN 1-58053-093-1; Artech House Publishers herein incorporated by reference.

It would thus be desirable to deliver ring tunes to a mobile station via WAP or other similar service. There is also a need to provide the consumer with a system to approve or decline the billing of a delivered tune. There is also a need to provide for crediting a consumer who accepts advertising in the form of logo and/or jingles.

SUMMARY OF THE INVENTION

A novel system to deliver and reproduce personalizing ringing tune data or other such multimedia content to a wireless handset's WAP browser is provided. Additionally, a novel system is provided that allows a consumer to preview the multimedia content (e.g. ring tune) and either approve or decline being billed for the particular multimedia message content. The consumer may also receive credit for accepting advertising content. The user requests media content by sending a message with a header comprising an identification number, the user then receives a message which comprises the media content and a Universal Resource Locator (URL), upon accepting the media by saving the media in a non-volatile memory; a primitive is generated based on the URL. This is incorporated in a message and sent to an accounting server.

An advantage of this invention is that a consumer can select multimedia content such as ring tunes directly from a handset and not have to be in front of a PC to select multimedia content for delivery via SMS or Multimedia Message Service (MMS).

A BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION

Figure 1:
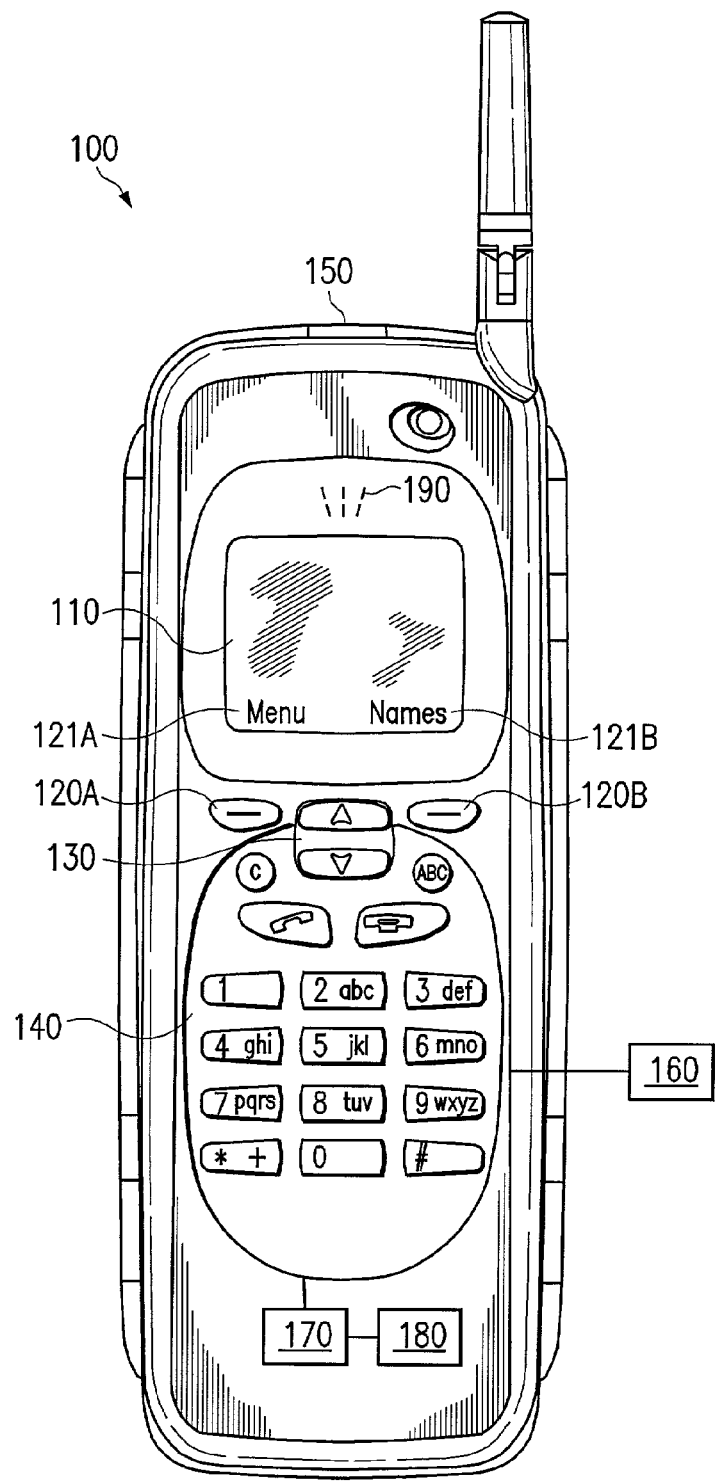
FIG. 1 is an illustration of mobile station with limited screen size and keyboard.

The invention may be used in radio systems which provide for a browser. The examples describe the use of the invention in a Universal Mobile Telecommunication System (UMTS) utilizing a broadband code division multiple access (CDMA), (TDMA), method implemented with any WAP or the like, yet without restricting the invention thereto.

SMS has evolved to include mobile multimedia. Multimedia Message Service (MMS) includes images, audio, video, data, and text or combinations thereof.

Assignee of the present invention introduced a messaging concept called Smart Messaging at CeBit 1997. Smart messaging allows Internet information to be delivered to any GSM mobile station that supports short messages. Smart Messaging utilizes the Artus Messaging Platform that retrieves Internet information in HTML format and converts it to a short message via TTML. TTML, a subset of HTML, is Nokia's protocol for presenting information accessed from the Internet on GSM phones. Since Internet content retrieval is done in HTML content providers do not need to make changes to Web servers. Developers gain unified access to the entire global user community, by wireless telephony also.

Other mark-up languages such as XHTML and TML (Task Mark-up Language) are currently being used. Those skilled in the art may be able to use these other languages. The scope of the invention is not intended to be limited to any one mark-up language.

Smart Messaging uses the Narrowband Sockets protocol, developed jointly by Intel and Nokia. It does for wireless phones what the Windows sockets stack does for Microsoft's operating system: i.e. it provides a standard means of connecting to the Internet.

The Narrowband Sockets (NBS) specification is an open industry specification initially developed by Intel and Nokia. Using the functions defined in this specification, wireless messaging applications for mobile PC and SmartPhone users are able to be created using familiar Internet programming interfaces. The NBS specification extends the reach of the Internet to create "always-connected" mobile station clients.

The NBS specification defines an efficient implementation of UDP and TCP services over wireless messaging networks. NBS is also network independent, so applications may use NBS to send and receive data via short messages over any network. The NBS specification provides BSD socket and Winsock2 programming interfaces, all of which are well known to those skilled in the art.

*Narrow-Band Sockets Specification*, Revision 1.0, Mar. 7, 1997 may be downloaded from Nokia Forum as can a white paper entitled Narrowband Sockets; which are directed to a wireless messaging protocol and API for enabling AOAC mobile communications. Both specification and white paper are incorporated herein by reference.

Sending messages including graphics is taught by International Patent Application Number PCT/EP00/02370 published on Sep. 28, 2000, as Publication Number WO 00/57617. The international application is assigned to assignee of the present application and is incorporated herein by reference.

Referring to the figures in the present invention, FIG. 1 is an illustration of a typical mobile station that would incorporate an embodiment of the present invention. This illustration is an exemplar only and the arrangement described is not critical to the practice of the invention. In this case, mobile station 100 is a wireless phone handset with a limited screen view and handset. Mobile station 100 could comprise a wireless system which operates according to any various cellular standards, such as Global System for Mobile communication (GSM), Code Division Multiple Access (CDMA) or any of their progeny and the like.

Information on CDMA is provided by Telecommunications Standards (TIA). The books *IS-95 CDMA* and *CDMA2000* by Vijay K. Garg; ISBN 0-13-087112-5; published by Prentice Hall (New Jersey; www.phptr.com) and WCDMA for UMTS Radio Access for Third Generation Mobile Communications edited by Harri Holma and Antti Toskala (both of Nokia, Finland); ISBN 0 471 72051 8; published by John Wiley and Sons, Ltd provide a understanding of the material. Both books are incorporated herein by reference.

Mobile station 100 comprises a display 110 which displays data, menus and areas for softkey functions 121A and 121B that can be activated by pressing of softkeys 120A and 120B. Scroll keys 130 are also provided to scroll through menu items featured on display 110. Scroll keys 130 may also be a rolling cylinder, ball or the like which will allow for scrolling through items displayed. Keyboard 140 operates for the input of data. The keys of keyboard 140 may also be illuminated by various methods known to those skilled in the art to produce a visual reminder in response to an event. Entry of data may be facilitated by the use of predictive keyboard entry that is known by those skilled in the art. Data is stored in a memory 180. Memory 180 may include volatile Random Access Memory (RAM) including a cache area for the temporary storage of data. Mobile station 100 may also comprise non-volatile memory 160, which may be embedded or may be removable such as a removable Subscriber Identification Module (SIM). Non-volatile memory 160 may be EEPROM or flash memory and the like available from SanDisk (Sunnyvale, Calif.) or Lexar Media (Fremont, Calif.). Memories 160 and 180 may include logic that controls the operation of processor 170 to implement functions according to embodiments of the invention. The logic may be software or firmware code. Processor 170 generates appropriate commands and controls the other component blocks of mobile station 100. Processor 170 may also have embedded cache memory.

Mobile station 100 also comprises a speaker 190 for providing sounding of the ring tunes.

The display may also be a virtual display such as is provided by MicroVision (Seattle, Wash.). The display may also be the housing of mobile station 100 using electronic ink from E Ink Corporation (Cambridge, Mass.), and Lucent Technologies' (Cambridge, Mass.) active-matrix drive circuits printed on plastic. The special inks consist of nanometer-sized semiconductor particles such as those developed by Joseph Jacobson et al. Attention is directed to U.S. Pat. Nos. 5,930,026; 5,961,804; 6,017,584; 6,072,716; 6,118,426; 6,120,588; 6,120,839; and 6,130,773, all of which are herein incorporated by reference. The work on this technology has been conducted at MIT, and more recently at E Ink.

Mobile station 100 may also be provided with an interface to allow the audio of the mobile station including the ring tunes to be play over an existing audio system. Such an interface is provided by U.S. Pat. No. 6,163,711 entitled METHOD AND APPARATUS FOR INTERFACING A MOBILE PHONE WITH AN EXISTING AUDIO SYSTEM issued on Dec. 19, 2000 to Juntunen et al and assigned to assignee of the present application, which is incorporated herein by reference. This provides for a better speaker system which will allow for the playing of polyphonic tunes.

Mobile station 100 also may have infrared transceiver 150 or other means of local data transfer so that data may be shared with other devices such as other mobile stations, car guidance systems, printers and the like. The sharing of data may also be provided by a Radio Frequency IDentification (RFID) transponder tag that is known to those in the art as a means for local data transfer. Mobile station 100 may also include a charge couple device or other such image capture device. Another means for sharing data is provided by Bluetooth.

Embodiments in accordance with the invention may be used in bearer services such as SMS, Circuit Switched Data (CSD), 3rd Generation Partnership Program (3GPP), and bearer independent solutions such as Wireless Application Protocol (WAP) and the like.

Details on WAP architecture and specifications are available from the WAP Forum and are herein incorporated by reference. The WAP specifications provide for a Wireless Applications Environment (WAE). WAE provides a general application environment which builds on the World Wide Web (WWW) model of technologies.

In the WWW model, servers present content to clients in a standard format such as HTML or XML—also referred to as webpages or documents. The documents are browsed by user agents known as browsers embedded in the client. Resources on the WWW are named with internet standard Universal Resource Locators (URL)s. The browser communicates with the server using standard networking protocols, the most common of which is Hypertext Transport Protocol (HTTP).

WAE follows the WWW model. Content is in a standard format such as WML, which is similar to XML. In WAP, pages or documents of the WWW domain become cards or decks. Applications are provided which parse HTML formatted documents and translates them into HDML or WML format decks/cards. The content is transported using HTTP in the WWW domain of the network and HTTP-like protocol referred to as Wireless Session Protocol (WSP) in the wireless domain.

Figure 2:
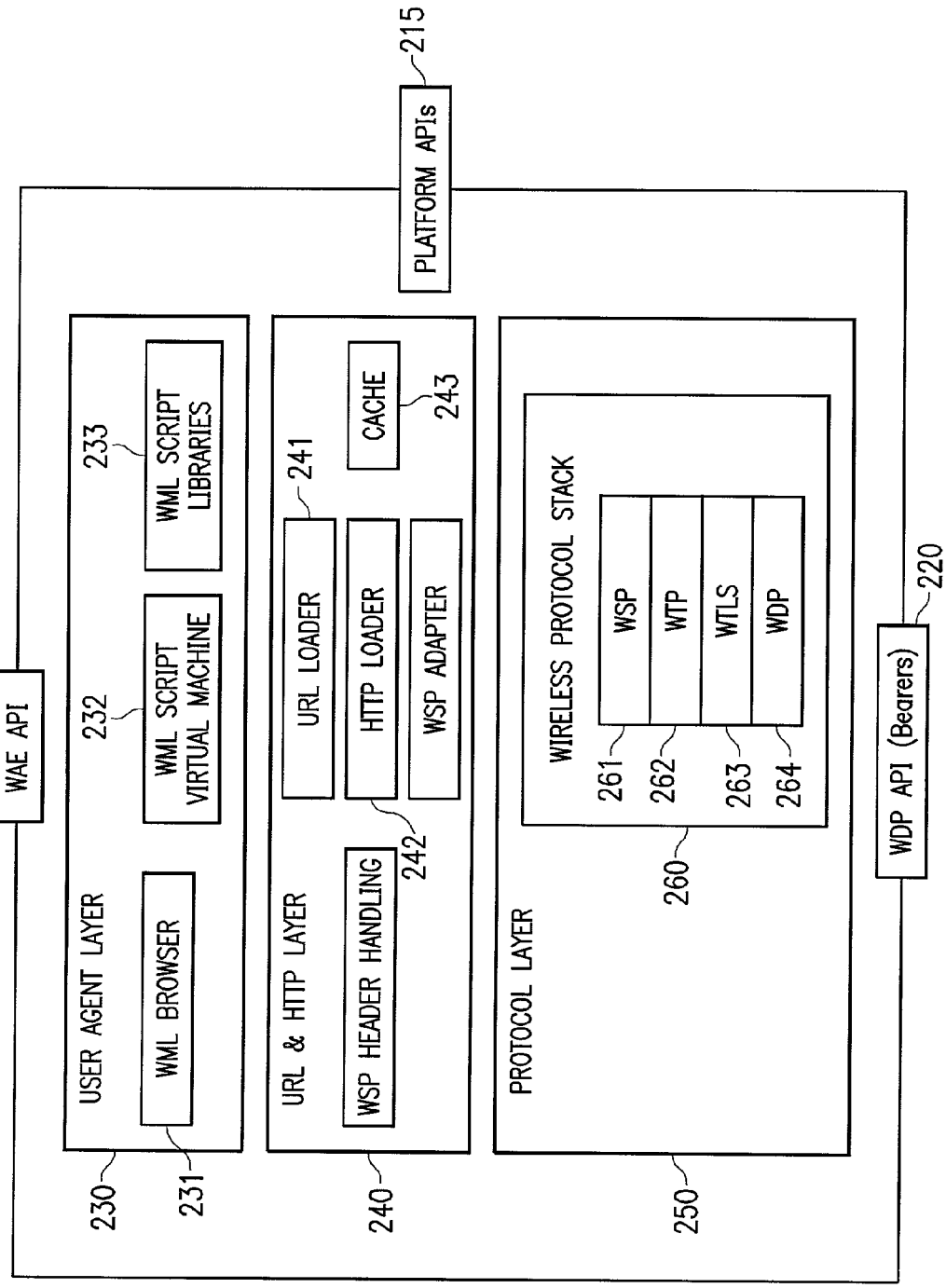
FIG. 2 is an illustration of a WAP browser.

FIG. 2 is an illustration of a WAP client. In the preferred embodiment of the present invention, Mobile station is configured as a WAP client. Like most network architecture, WAP is organized as a series of layers. WAP client 200 comprises user agent layer 230, URL & HTTP layer 240, and protocol layer 250. WAP client 200 of FIG. 2 also comprises various Application Program Interfaces (API)s, such as Wireless Applications Environment (WAE API) 210, Platform APIs 215, and Wireless Datagram Protocol (WDP API) 220.

WDP adopts the User Datagram Protocol (UDP) defined in the WWW domain and the WDP API may support data bearer services of standards such as GSM, CDMA, GPRS, CDPD and the like.

User Agent Layer 230 comprises WML browser 231, WMLScript virtual machine 232 to program a mobile station, and WMLScript libraries 933 that are a set of standard functions. WML browser also referred to as a microbrowser communicates with a gateway using WSP. The gateway communicates with the server using HTTP.

URL & HTTP Layer 240 comprises URL Loader 941, HTTP Loader 242, and cache 243.

Protocol Layer 250 comprises wireless protocol stack which in-turn comprises Wireless Session Protocol (WSP) 261, Wireless Transaction Protocol (WTP) 262, Wireless Transport Layer Security (WTLS) 263 for security control, Wireless Datagram Protocol (WDP) 264 may be coupled to bearer services and provides service to the upper layers on protocol stack 260.

Figure 3:
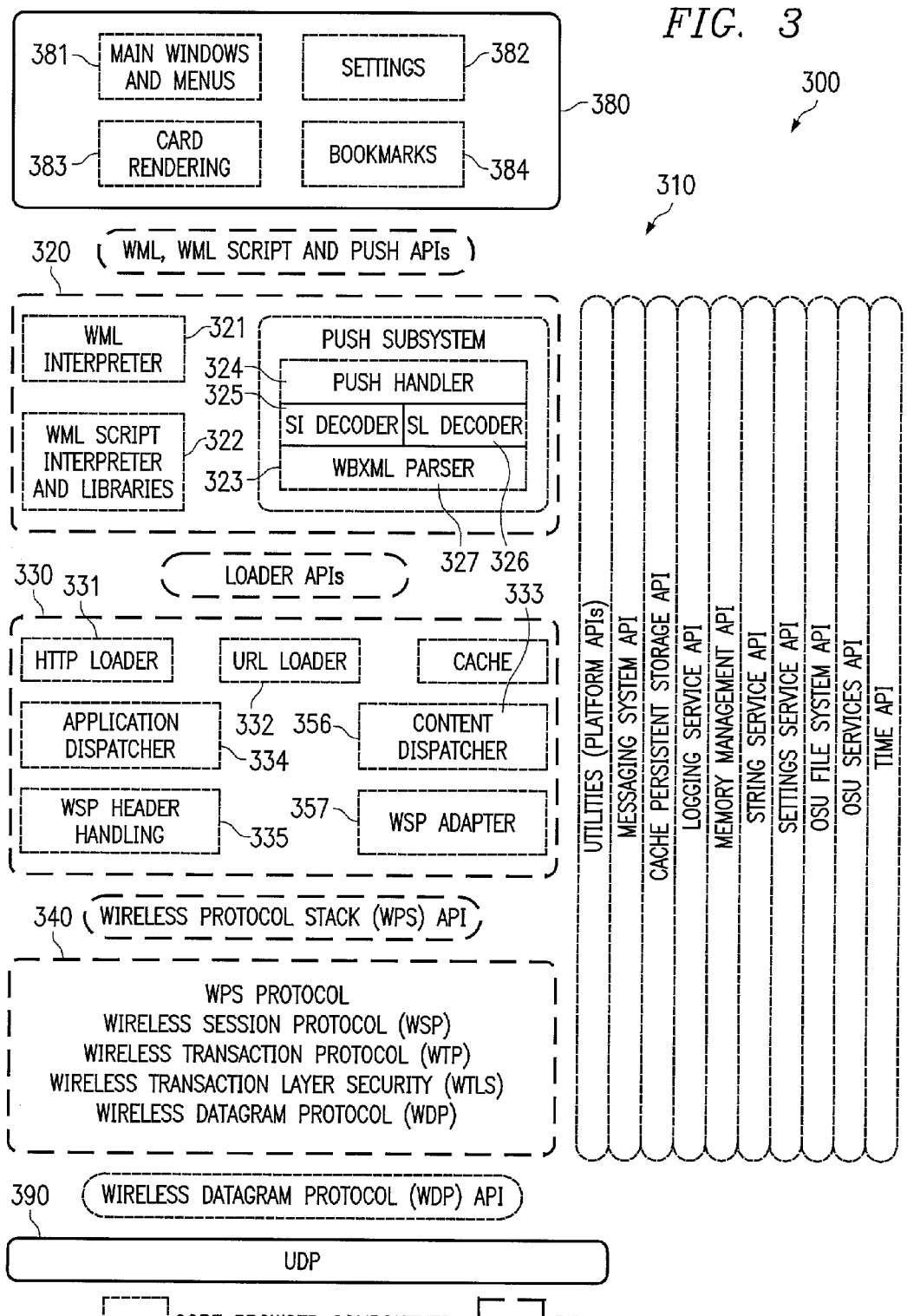
FIG. 3 is an additional illustration of a WAP browser.

FIG. 3 is another example of a WAP client on mobile station 100 of FIG. 1. Client 300 comprises, WML browser components 310, User Interface (UI) level 380, and Bearer level 390. WML browser interprets the WML contents (cards and decks) received from the WAP gateway and passes the content to Ul using the APIs provided. The WML browser also maintains the browser state information.

UI level 380 further comprises main windows & menu component 381, settings 382, card rendering 383, and bookmark 384 components.

Bearer level 390 includes an implementation of a User Datagram Protocol (UDP) bearer. This bearer is capable of supporting Circuit Switched Data (CSD) networks.

User Agent (UA) Level comprises the core of the browser 310, namely, WML Interpreter 321, WMLScript Interpreter and standard libraries 322, and Push Subsystem 323. WML Interpreter 321 supports the WML language specification including WBMP image files, an asynchronous image loader, and cookies. WMLScript Interpreter 322 handles encoded WMLScript content and performs operations specified by the content. Libraries include support for browser and URL handling functions. UA Level interfaces with the UI Level using WML, WMLScript and Push APIs.

Push Subsystem 320 further comprises Push Handler 324, Service Indication (SI) Decoder 325, Service Loader (SL) Decoder 326, and a WBXML Parser 327. Push Subsystem utilizes the WBXML parser to dispatch Push messages to either Si Decoder 325 or SIL Decoder 326. Once the message has been decoded, Push Handler 324 interacts with the mobile station's services, (i.e. messaging, alerts), and client's Loader Level 330 to complete the Push process.

Loader Level 330 comprises HTTP Loader 331, URL Loader 332, Cache 333, Application Dispatcher 334, WSP Header Handling 335, Content Dispatcher 356, WSP Adapter 357. Loader Level 330 handles the loading of URLs using HTTP scheme. URL and header validations are performed at this level. Support for cookies and basic authentication are also provided. Cache logic and storage may also be supported at this layer. Loader Lever 330 also provides for content and application dispatching including Push dispatching. Loader Lever 330 interfaces with Wireless Protocol Stack (WSP) Level via WSP handling API and UA Level via Loader APIs.

Example clients and browsers provide for host specific content types—also known as Multimedia Internet Mail Extension (MIME)-types, which allows the mobile station to perform functions above those normally allowed by the client. The present invention provides a novel MIME-type and file formats to allow mobile station to perform special network operations such as downloading ring tunes and bitmaps.

Thus, a ring tune or other multimedia may be downloaded and the response posted to the included an URL.

The bitmaps may be displayed on display 110 of mobile station 100. Another embodiment may be provided if the housing of mobile station 100 is manufactured with special inks created by E-Ink which allow for displays to be created on flexible plastics. Therefore, the whole mobile station housing may be an advertisement.

MIME describes how messages are sent on the Internet. HTTP and the like protocols uses mime-typing to allow servers to specify the type of data they are returning to a client. For the Nokia 6185 mobile station, a new mime-type is defined as "appIlication/nmp-content." This mime-type is normally associated with files having an ".nmp" extension, but a server may use this mime-type for any file.

'NMP Content' Type Header

Data marked as "application/nmp-content" should begin with a specific header so that the mobile station may recognize its data type.

TABLE 1

NMP_HEADER

| Field | 1.1 Size (bytes) |
|---|---|
| FILE_TYPE | 8 |
| LENGTH_MSB | 1 |
| LENGTH_LSB | 1 |
| SUB_FIELD_CNT (novel field) | 1 |
| RESERVED | 1 |

As can be seen from Table 1, the header comprises a FILE_TYPE field which is eight bytes of ASCII text designating the file type. Further information on file type is provided by Table 2.

LENGTH_MSB—Most significant byte of data following the header.

LENGTH_LSB—Least significant byte of data following the header.

SUB_FIELD_CNT—Number of sub-field blocks

RESERVED—Reserved bits.

TABLE 2

File Types

| FILE_TYPE (ascii) | 1.2 Type |
|---|---|
| "NMP-RNG0" | Ring Tune |
| "NMP-BMP0" | Wakeup bitmap |
| "NMP-PPC0" | Performance counter request |
| "NMP-CNT0" | Generic Content Data (new) |
| "NMP-CMT0" | Commit Data Order (new) |

"NMP-RNG0" File Types

The NMP-RNG0 file type is used for downloading ring tunes. Table 3 provides the format for a ring-tune file type.

TABLE 3

Ring Tune File Type

| Field | 1.3 Size (bytes) |
|---|---|
| FILE_TYPE | 8 |
| LENGTH_MSB | 1 |
| LENGTH_LSB | 1 |
| RESERVED | 2 |

TABLE 3-continued

Ring Tune File Type

| Field | 1.3 Size (bytes) |
|---|---|
| RING_NAME | 12 |
| RING_DATA | 2 to 200 |

FILE_TYPE, LENGTH_MSB, LENGTH_LSB, RESERVED are as in Table 1 with FILE_TYPE being NMP-RNG0.

RING_NAME is an ASCII string which names the ring tune. RING_DATA is a binary NMP ring format. This data format was provided in U.S. Pat. No. 6,094,587 entitled PROGRAMMING OF A TELEPHONE'S RING TONE issued to Armanto et al. on Jul. 25, 2000, and assigned to assignee of the invention described herein.

The ringing tone can be changed into characters and included in the short message as characters in the form of notes in the following way.

Notes in characters:

C, D, . . . , G, A, H Notes from A to G of a lower octave c, d, . . . , g, a, h Notes from A to G of a higher octave raises the preceding note a semitone (e.g., high)

b flattens the preceding note a semitone (e.g., dull)

Duration:

no character basic length preceding note: half the basic length

+ preceding note: double the basic length

. preceding note: 1.5 times the basic length

. . preceding note: 1.75 times the basic length

A length character may be cumulative, e.g., a single character always contributes to the effect of the character preceding it. For example, C+ means three times the basic length, C—means 0.125 of the basic length.

Rests:

; rest; as long as the basic length

, rest; half the basic length

Other rests can be input by using characters modifying the length of a note together with rest characters.

As presented above, a ringing tone produced by notes can be coded in characters, which can be sent in a short message, whereupon, in reception, the received characters can be processed into the transmitted ringing tone, which can be stored in a ringing tone memory and reproduced when the phone rings. Thus, the method is particularly suitable for a device, wherein the ringing tone can be programmed as notes through a user interface or it has been pre-stored in a ringing tone memory as notes.

In addition to the specifications presented above, other factors related to a ringing tone and its specification can also be specified as characters, e.g., in the following way:

:ACD :X

,wherein X is an optional number (integral number), repeats a note sequence ACD X times, twice if X is missing /X ACD/,wherein X is an optional number (integral number), reduces the length of notes inside characters "/" e.g., by dividing by number X. Third notes, according to this specification, would be marked "/3 ACD/"

$ Inputs sharp and flat notes, e.g., for all notes inside parentheses, in which case it is not necessary to separately input character # or b for these notes.

(:) Specifies repetitions, e.g., so that (5CD:2E:F) is played CDE CDE CDF CD CD.

! Switches on/off a "staccato" music mode, e.g., until the following character, increases the length of a note by an appropriate percentage and reduces the proportion of a rest, thus accomplishing a fragmentary style without changing the overall time. In a computer simulation, increasing the length of a note by 50-60% or even by 70% sounds good still.

? Switches on/off a separate notes function, e.g., until the following character, increases the length of a note for a minimum period of time and a rest lasts for the rest of the time producing music, where two same notes one after another can be heard as separate notes, unlike a "flowing" music mode, wherein preceding notes would be heard as a single note. A rest between notes must have the same duration.

Notes that are shorter than the specified rests cannot be heard as separate notes. In a computer simulation, rests between notes that last for about 30 ms sound good by means of the separate notes function.

' Raises a default octave. If the default octave is 1, raises it to 2, otherwise 1.

" Lowers a default octave. If the default octave is 3, lowers it to 2, otherwise 3.

If it is assumed that there are 4 octaves in use, it is possible to use, as presented above, two octaves simultaneously by means of capital and small letters C . . . H, c . . . h.

X raises all following notes X by one degree, wherein X is an integral number. Flattens, if X is a negative number.

Number Specifies a tempo, beats per minute, e.g., how many notes of (alone) the basic length per minute.

Empty space to be ignored.

In addition, a ringing tone can be combined with some other message through a user interface, for example:

* flashing light when the phone is ringing—switches the light on/off.

ASCII characters are transformed into binary characters. The ASCII characters may be presented as hexadecimals, which can be easily further transformed into binary numbers. In the following, we will present how the word "Calling" is transformed into a binary number. In the following, two numbers, in a hexadecimal form, correspond to the ASCII character, separated by a space, and each of the hexadecimal characters can be presented in four bits, i.e., in the following, each ASCII character is presented by means of 8 bits.

As ASCII characters: "Calling"

In the hexadecimal form: 43 61 6C 6C 69 6E 67

In the binary form: 0100 0011 0110 0001 0110 1100 0110 1100 0110 1001 0110 1110 0110 0111

In the actual transmission, the characters are sent one after another without spaces, i.e., as an unbroken bit sequence. Thus, for each ASCII character, there is a specific hexadecimal and binary form, in which case the examples presented above for specifying notes by means of ASCII characters can be transformed into binary characters.

Another alternative for sending a ringing tune as characters is to first convert it into a MIDI form (Musical Instrument Data Interface), which is a well known communications language for instruments. This could be implemented by arranging, in a mobile station, a MIDI converter. The MIDI converter would preferably be located in the processor which, in this case, in reception, would convert the characters, received in MIDI, into an appropriate form for the telephone's ringing tone generator and memory. Similarly, in transmission, the MIDI converter would convert the ringing tune into characters in accordance with the MIDI form. The MIDI converter would enable ringing tunes to be composed, e.g., by means of computer-based composition programs supporting the MIDI form and, thus, the transmission of the produced melody from a computer or server to a mobile station, e.g., in a short message.

"NMP-BMP0" File Types

This file type is used for downloading wakeup or other bitmaps.

TABLE 4

Wakeup BMP File Type

| Field | 1.4 Size (bytes) |
|---|---|
| FILE_TYPE | 8 |
| LENGTH_MSB | 1 |
| LENGTH_LSB | 1 |
| RESERVED | 2 |
| BMP_FORMAT | 1 |
| BITS_PER_PIXEL | 1 |
| BMP_HEIGHT | 1 |
| BMP_WIDTH | 1 |
| PIXEL_DATA | varies |

FILE_TYPE, LENGTH_MSB, LENGTH_LSB, RESERVED are as in Table 1 with FILE_TYPE being NMP-BMP0.

BMP_FORMAT field is 0x00 for an NMP Bitmap Format. 0x00 to 0xFF are reserved.

TABLE 5

BMP Formats

| BMP_FORMAT | 1.5 Format |
|---|---|
| 0x00 | NMP Bitmap Format |
| 0x01-0xFF | Reserved |

The BITS_PER_PIXEL field indicates the number of unsigned bits for each pixel.

The BMP_HEIGHT field indicates the height of the bitmap height in pixels (unsigned).

The BMP_WIDTH field indicates the width of the bitmap in pixels (unsigned).

PIXEL_DATA is a stream of bytes representing the bitmap data.

"NMP-PPC0" File Types

This file type is used for downloading a PPC request file. This file contains a list of ids whose corresponding data should be uploaded.

TABLE 6

PPC Request File Format

| Field | 1.6 Size (bytes) |
|---|---|
| FILE_TYPE | 8 |
| LENGTH_MSB | 1 |
| LENGTH_LSB | 1 |
| RESERVED | 2 |
| SCRIPT_URL | 1 to 150 |
| SPECIAL_DATA | 1 |
| PPC_LIST | 0 to 255 |

FILE_TYPE, LENGTH_MSB, LENGTH_LSB, RESERVED are as in Table 1 with FILE_TYPE being NMP-PPC0.

SCRIPT_URL is a NULL terminated ASCII string containing the URL of a Common Gateway Interface (cgi) or other script that will process the resulting data. SPECIAL_DATA is a bitmask of the special data requested. More information is provided in Table 7.

PPC_LIST is a list PPC_Ids whose data is to be uploaded.

TABLE 7

PPC Special Requests

| SPECIAL_DATA | 1.7 Parameter |
|---|---|
| 0x01 | Mobile Identification Number (Required) |
| 0x02 | MCU Software version String |
| 0x04 | DSP Software version String |
| 0x08 | PRL version number |
| 0x10 | Life/Warranty Timer value |
| 0x20 | Reserved |
| 0x40 | Reserved |
| 0x80 | Reserved |

"NMP-CNT0" File Types

This file type is an evolution from the downloadable file format, and includes a variety of content types.

TABLE 8

CNT0 File Format

| Field | 1.8 Size (bytes) |
|---|---|
| FILE_TYPE | 8 |
| LENGTH_MSB | 1 |
| LENGTH_LSB | 1 |
| SUB_FIELD_CNT | 1 |
| RESERVED | 1 |
| One of more occurrences of the following SubID record: | |
| SUB_ID | 1 |
| LENGTH_MSB | 1 |
| LENGTH_LSB | 1 |
| RESERVED | 1 |
| SUB_ID_DATA | LENGTH |

FILE_TYPE, LENGTH_MSB, LENGTH_LSB, RESERVED are as in Table 1 with FILE_TYPE being NMP-PPC0.

SUB_FIELD_CNT is a novel field as seen in Table 1.

| SUB_ID TYPES | |
|---|---|
| RING_BINARY | 0x00 |
| RING_SMART_MSG | 0x01 |
| RESERVED | 0x02 through 0x0F |
| BMP_BINARY | 0x10 |
| BMP_X_UP_BMP | 0x11 |
| BMP_WBMP | 0x12 |
| RESERVED | 0x13 through 0x1F |
| RESPONSE_URL | 0x20 |
| RESERVED | 0x21 through 0xFF |

SUB_ID Block Data Formats

Each SUB_ID Block has a unique data format according to its type. This data is positioned in the SUB_ID_DATA field of the block record. As of filing of the present application, only three data types are defined:

RING_BINARY—Contains the same data type as NMP-RNG0 (see table 3)

| Field | Size (bytes) |
|---|---|
| RING_NAME | 12 |
| RING_DATA | 2 to 200 |

BMP_BINARY—Contains the same data type as NMP-BMP0 (see table 4)

| Field | Size (bytes) |
|---|---|
| BMP_FORMAT | 1 |
| BITS_PER_PIXEL | 1 |
| BMP_HEIGHT | 1 |
| BMP_WIDTH | 1 |
| BMP_DATA | varies |

RESPONSE_URL—Contains an URL to "goto" to receive the commit message. If this field exists in the data file, the device, e.g mobile station, must make an HTTP "GET" request to the included URL and not write the data until it receives a commit message.

| Field | Size (bytes) |
|---|---|
| URL_DATA | N |

URL_DATA is a string of ASCII characters.

"NMP-CMT0" File Types

This file type designates a content commit order. When a file is downloaded that includes a response URL, the device must make an HTTP "GET" request to the included URL. The server may then reply with a file of this type to inform the mobile station that it is has permission to save the data to permanent memory. This mime-type has no data.

| Field | 1.9 Contents |
|---|---|
| FILE_TYPE | "NMP-CMT0" |
| LENGTH_MSB | 0 |
| LENGTH_LSB | 0 |
| SUB_FIELD_CNT | 0 |
| RESERVED | 0 |

The system and method for using the novel header and file format is as follows:

Included two data blocks, a ring tune and commit URL in a message.

The ring tunes are converted to a binary block (in the preferred embodiment—the SUB_ID BLOCK format) file. Then, another binary file for the commit URL block is created. The files are concatenated and a header is prepended including the combined length.

As an examplar:

Old Format:
  8 bytes identifier (i.e. NMP-RNG0)
  2 bytes length
  2 bytes reserved
  N bytes of data (specific for each type)

New Format:
    8 bytes identifier (specifically "NMP-CNT0", old format/
        header supported)
    2 bytes length
    1 byte num_sub_params
    1 byte reserved.
    (optionally repeated versions of the following)
    1 byte subblockID (00-Ring Binary, 01-Ring Smart Msg,
        20-Commit URL)
    2 bytes length
    N bytes data Another Embodiment of the New Format::
    8 bytes identifier (specifically "NMP-CMT0"-commit
        order)
    2 bytes length==0
    2 bytes reserved==0

This novel format supports multiple content types in the same file. Therefore, five ring tones may be download in one file, or a ring tone and a bitmap. This allows multimedia such as message profile themes to be downloaded.

Figure 4A:
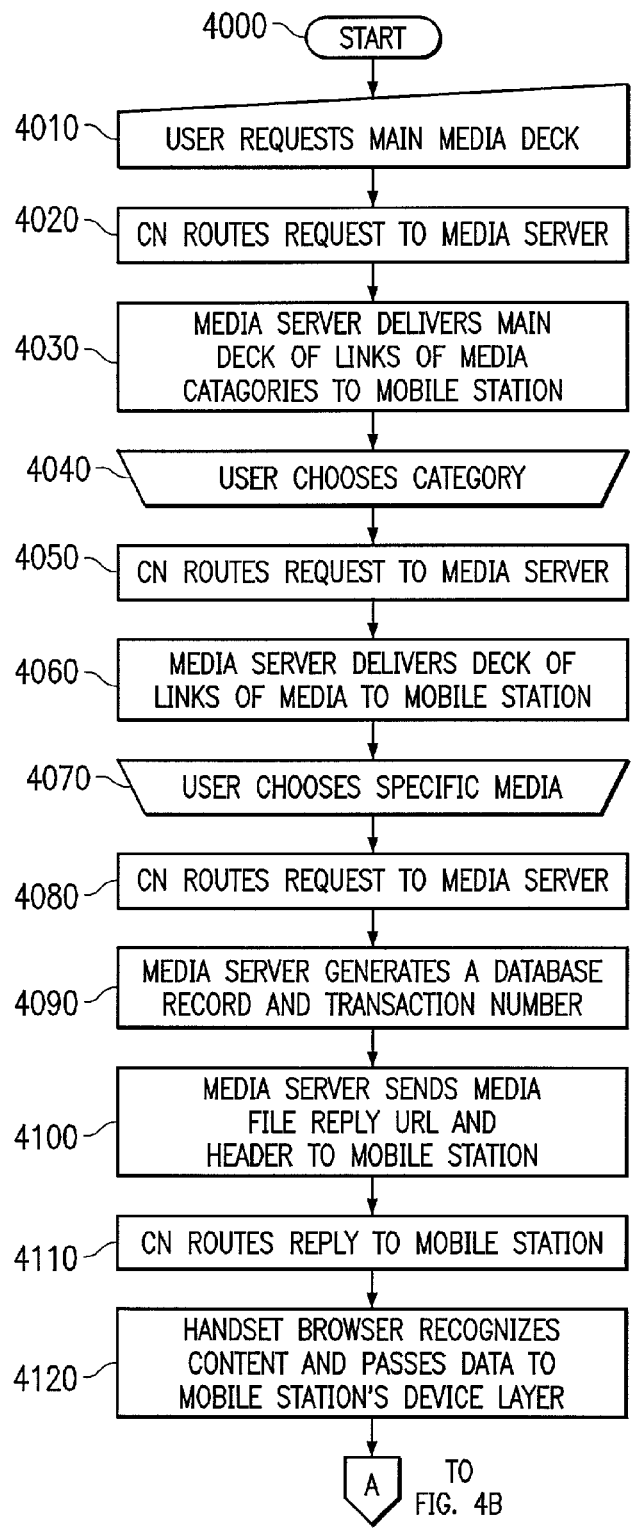
FIG. 4 is a flowchart illustrating an embodiment in accordance with the invention, it consists of FIGS. 4A, and 4B.
Figure 4B:
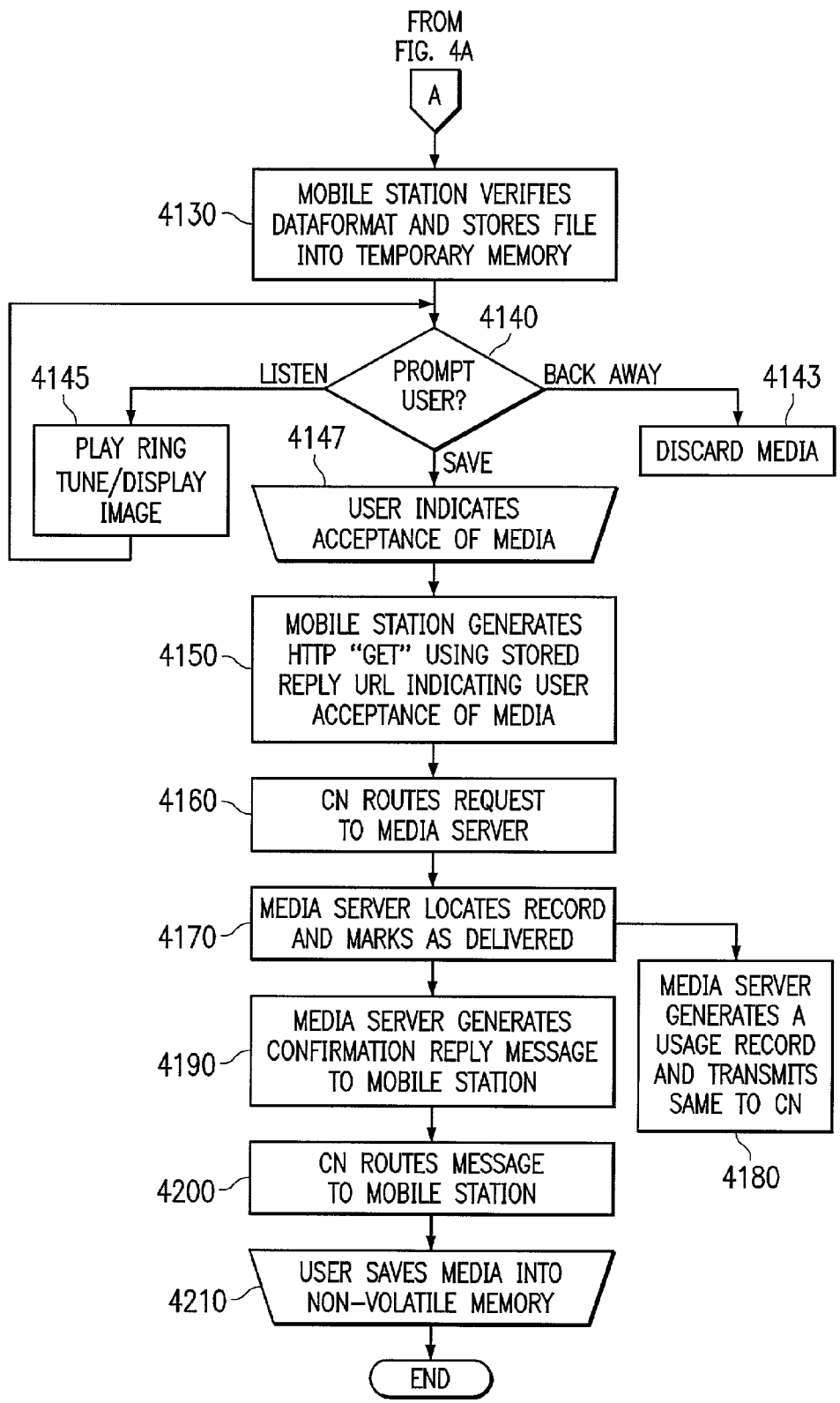
Figure 5:
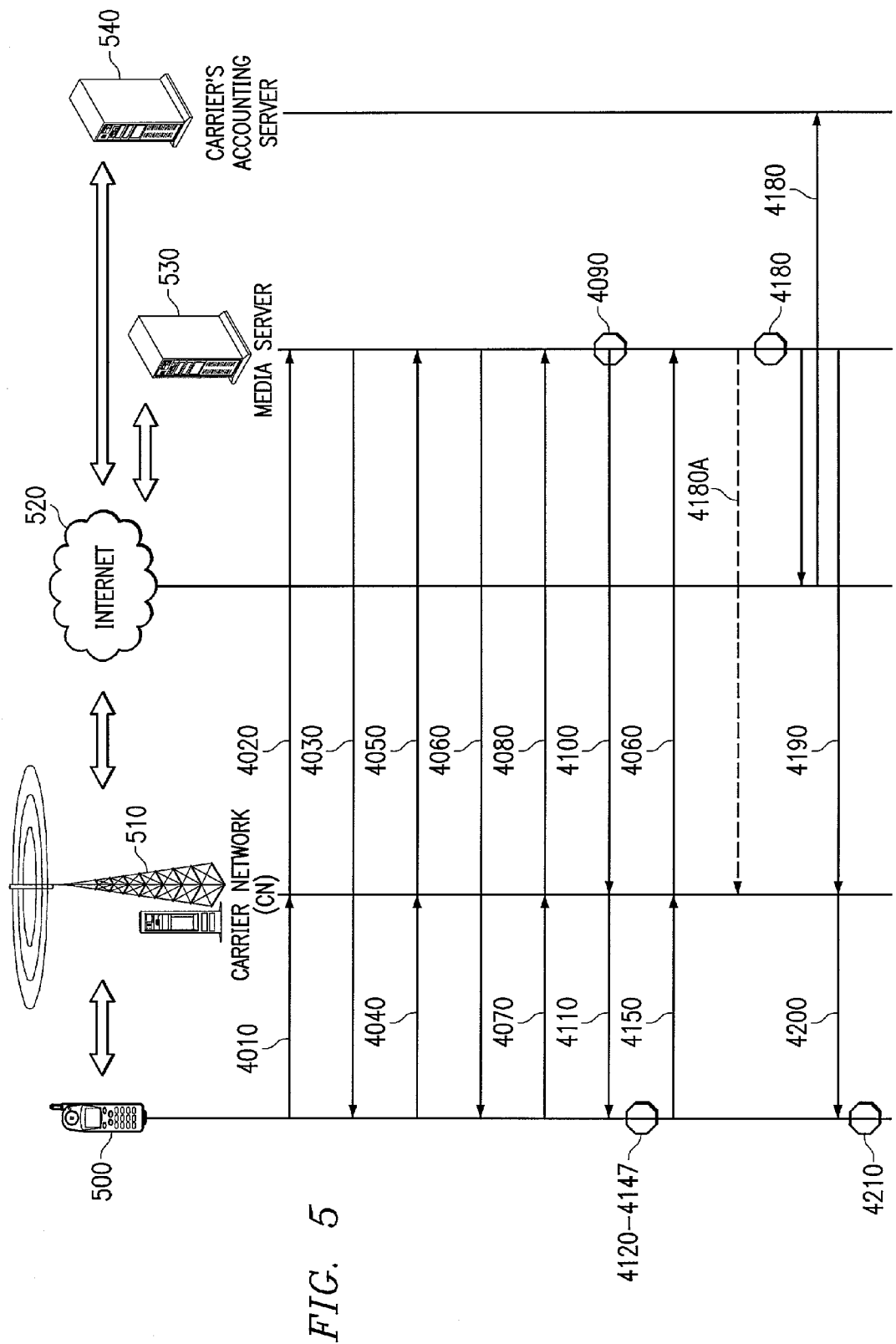
FIG. 5 is a session diagram showing hardware associated with the various steps shown in FIGS. 4A and 4B.

FIG. 4 which consists of FIGS. 4A and 4B is a flowchart showing various steps to be taken in accordance with an embodiment of the present invention. FIG. 5 is a session diagram showing the flow between the various network entities. The steps referenced in FIG. 4 are repeated in FIG. 5 to show flow from entity to entity.

Referring now to FIG. 4A and FIG. 5, the system starts at step 4000. At step 4010, the user of a device such as a mobile station 100 of FIG. 1, (500 in FIG. 5), requests a main ring tune deck from a ring tune or media server 530 entering the URL of the media server 530. The URL may also be selected for a pre-stored list of URLs commonly referred to in the art as bookmarks or favorites. In the preferred embodiment, the user may be presented with a special menu on the display when the power-button of the mobile station 500 is depressed. In this case, the URL has already been stored in the mobile station 500 and pressing a selection on this special menu invokes the browser using the stored URL.

The carrier network (CN) 510 routes the request to media server 530 through the Internet 520 via WAP gateway or the like at step 4020. HTTP header contains the Mobile Identification Number (MIN) of mobile station 500.

Media server 530 may be a server for a copyright clearance provider such as BMI. Media server 530 may be owned by an Internet Service Provider (ISP) or by a carrier network. The media server 530 may also be owned by a record company or copyright clearance provider such as BMI. In the preferred embodiment, the media server is part of the Club Nokia network.

At step 4020, media server 530 has received the requests and delivers a main HDML deck consisting of links that define ring tune or other media categories to the mobile station 500. This is routed through the carrier network 510 via WAP gateway. The categories are presented on display 110 (see FIG. 1) of mobile station 500 (100 in FIG. 1). See step 4030. User may then choose a category of media at step 4040. For example, the user may be interested in movie tunes/jingles and selects this category. The carrier network routes the request for the category via WAP gateway or the like through the Internet to the media server 530 (step 4050). Again the HTTP header has the MIN of the mobile station.

Figure 6A:
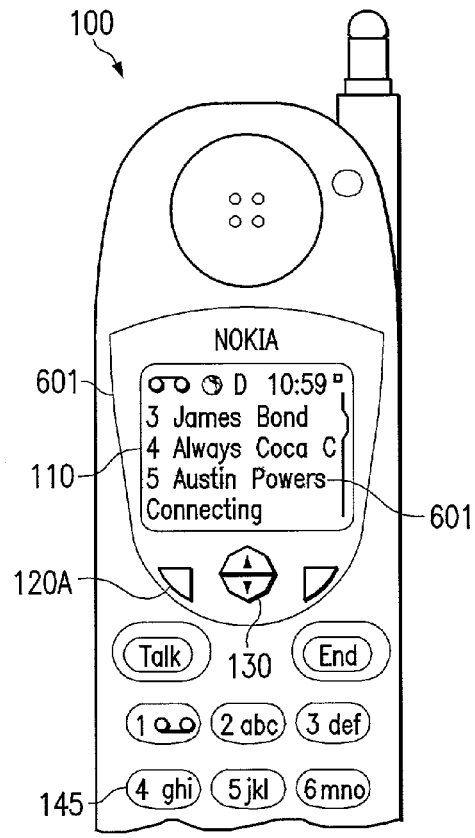
FIG. 6 shows a display sequence of a mobile station receiving a multimedia message in accordance with an embodiment of the invention.

At step 4060, media server 530 delivers a HDML deck consisting of specific links to the ring tunes based on the category selected by the user in step 4040. Again, in the preferred embodiment, this is routed by the carrier network 510. At step 4070, the user chooses a specific ring tune. FIG. 6A is an example of a typical display to select a tune. The figure shows "5 Austin Powers" as the selection chosen by the user. The list of tunes for this category is shown on display 110 of mobile station 100. The user may use scroll key 130 and softkeys 120A or 120B to make the selection. Alternatively, the user may press the number "5" key 145 to make the selection.

The selection has an URL tied to an Active Server Page (ASP). This is routed by the carrier network 510 via WAP gateway through Internet 520 to media server (step 4080). The HTTP header has the MIN of the mobile station.

At step 4090, using ASP, media server 530 generates a database record and a transaction number that reflects the specific mobile station 500 request based on time and MIN. The media server 530 sends the tune file and programmatically, (using ASP, JAVA applet and the like), generated reply URL header to mobile station in proper format using specific MIME-type as described above. This is done at step 4100 and is routed by carrier network 510 at step 4110.

At step 4120, the mobile station 500 recognizes the MIME content and passes the data to the mobile station's device layer. The system description continues on FIG. 4B. At step 4130 on FIG. 4B, the mobile station 500 verifies the data format and stores the file into temporary random access memory (RAM), e.g. memory 180 or cache of processor 170 in FIG. 1. The file may include reply URL with transaction number, tune/bitmap data and a label tag.

The user is then prompted via display on the mobile station 500 (step 4140). The user may "back away" and discard the media (step 4143). In this case, the transaction would be terminated and the user will not be billed for the media content. The user may also save without previewing or listen to the ring tune and/or view the image, 4145. At this point, the user is again prompted for a decision, (4140):

Discard (4143);
Listen again (4145); or
Accept the media and continue with the transaction (4147).

Figure 6B:
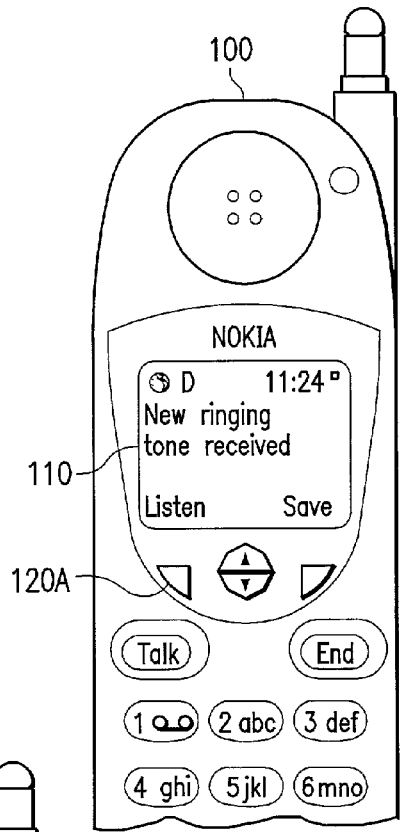

FIG. 6B shows an example of a typical display showing a choice offered to the user on display 110 of mobile station 100. The display 110 indicates that a new ring tone (or tune) has been received. The user may listen to the tune by pressing softkey 120A or save the tune by pressing softkey 120B.

Referring again to FIG. 4B, at step 4150, the mobile station 500 generates a HTTP "GET" primitive using the reply URL stored in RAM, indicating acceptance of the media, (ring tune or image). The carrier network 510 routes the acceptance message via a WAP gateway to the media server 530 (step 4160). The HTTP header contains the mobile station's MIN.

Media server 530, at step 4170, locates the record using information from the message such as the transaction number, the MIN, or a combination of information. Media server 530 generates a usage record and transmits same to the carrier which may store the transaction on accounting server 540. In another embodiment, the media server 530 may also serve as an accounting agent. However, in the preferred embodiment the carrier bills the user through an invoice to the user including other debits or credits for service and content.

Having the carrier handle the accounting allows for small transactions which may include fractions of cents to be combined with other charges for convenient billing/crediting and payment. The carrier may perform the accounting "in-house" or they may rely on accounting agents or other $3^{rd}$ parties who have developed accounting systems. Examples of such systems are Lucent's Kenan system (Cambridge, Mass.) or Amdocs' Ensemble (Stamford, Conn.). Accounting for copyright royalties and other costs associated with content provision may be performed by the accounting system.

There may be cases where the user may be able to get a credit on their bill based on the ring tune chosen and whenever the tune is played. For example, the user may select to download a theme from a movie being promoted or a jingle for a promoted product, e.g. Coca-Cola. The promoter may provide the user with credit to their bill or digital cash or coupon to be used to purchase an item. Digital cash and a method for mobile station payment systems are provided by U.S. Pat. No. 6,078,806 granted on Jun. 20, 2000; which is a continuation of U.S. Ser. No. 08/597,845 filed on Feb. 7, 1996, now U.S. Pat. No. 5,887,266 granted on Mar. 23, 1999, both entitled METHOD FOR USING APPLICATIONS IN A MOBILE STATION, A MOBILE STATION AND A SYSTEM FOR EFFECTING PAYMENTS, issued to Heinonen et al., assigned to assignee of the present invention and incorporated herein by reference. The promoter gets exposure because everyone in ear-shot of the user will hear the jingle. A download image of a corporate logo will also provided advertising for the promoter. The image may be displayed on display 110 or on cover itself using technology such as is available from Eink Corporation (Cambridge, Mass.)

Instead of a Pull process which has been described herein, wherein the user is pulling the content from the media server, a Push process may be used. As an example, in a Bluetooth enabled mobile station, promoters would be able to offer ring tunes to the user.

Referring again to FIG. 4B and FIG. 5, media server 530, at step 4190, also generates a confirmation reply message to the mobile station 500 using the novel MIME-type described above. The carrier network 510 routes this message to the mobile station 500 through a WAP gateway or the like (step 4200).

Figure 6C:
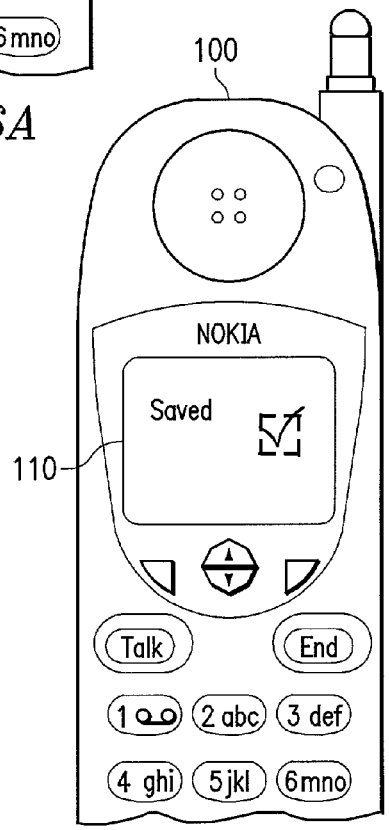

Upon receipt of the confirmation message, the mobile station 500 will save the media file (tune/bitmap and label) to non-volatile RAM. FIG. 6C shows a typical display informing the user that the ring tune has been "Saved." User must then select the ring tune or image following the procedure provided by the customization features offered by the mobile station 500.

Figure 7:
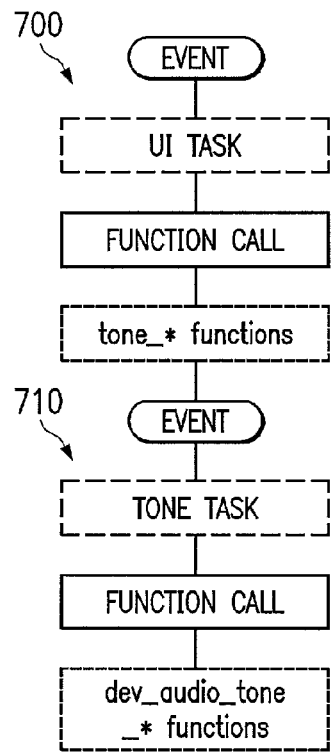
FIG. 7 shows a tone activation sequence in accordance with a embodiment of the invention.

The reply URL may also be stored in non-volatile RAM. The URL may be used to record and report back to the carrier accounting server 540 or media server 530 whenever a tune is played. As described above the playing of a tune may invoke the receipt of digital cash or credit to the user's bill. FIG. 7 shows a tone activation sequence 700. If the tone has a reply URL connected with it, a function call 710 may be invoked to activate the WAP browser and report usage of the tone to the accounting server 540 which may credit the user account. This process may also serve to account for per use royalty payments for media.

The credits may be maintained on the mobile station 500 itself. Digital cash or transaction credit value information may be stored, e.g. as a code word in mobile station's memory. Digital cash and a method for effecting payments are provided by U.S. Pat. No. 6,078,806 granted on Jun. 20, 2000; which is a continuation of U.S. Ser. No. 08/597,845 filed on Feb. 7, 1996, now U.S. Pat. No. 5,887,266 granted on Mar. 23, 1999, both entitled METHOD FOR USING APPLICATIONS IN A MOBILE STATION, A MOBILE STATION AND A SYSTEM FOR EFFECTING PAYMENTS, issued to Heinonen et al., assigned to assignee of the present invention and incorporated herein by reference.

The above transactions may be performed using a secured connection. Such connections are known in the art. One example of secure communications in a telecommunication system is taught by U.S. Pat. No. 5,915,021 issued to Herlin et al on Jun. 22, 1999, assigned to assignee of the present invention and incorporated herein by reference.

As will be recognized by those skilled in the art, the innovative concepts described in the present application can be modified and varied over a tremendous range of applications, and accordingly the scope of patented subject matter is not limited by any of the specific exemplary teachings given. Applicants herein define plurality to mean one or more.

What is claimed is:

1. A method comprising:
   requesting a ring tune by sending a message with a header including a mobile identification number from a mobile station;
   receiving a file with said ring tune requested, a reply Universal Resource Locator (URL) identifying a server, and a transaction identification at said mobile station;
   verifying a format of said file;
   temporarily saving said file within said mobile station based on the format of said file;
   previewing said ring tune on said mobile station;
   sending a primitive with said mobile identification number from said mobile station to said server identified by said reply URL upon acceptance of said ring tune;
   creating a usage record from said primitive;
   receiving, at the mobile station, permission to save said ring tune in response to receipt of the primitive at said server;
   permanently saving said ring tune within said mobile station only when the permission to save has been received from said server;
   reporting and updating said usage record upon use of said ring tune employing said reply URL; and
   receiving credit on a bill for compensating the use of said ring tune.

2. The method as recited in claim 1 wherein said file with said ring tune requested, said reply URL and said transaction identification conforms to a Multimedia Internet Mail Extension (MIME) format.

3. The method as recited in claim 1 further comprising sending a message from said mobile station to said server to update said usage record employing said reply URL when said mobile station uses said ring tune.

4. The method as recited in claim 1 further comprising receiving the bill indicating the use of said ring tune by said mobile station.

5. The method as recited in claim 1 further includes a secure connection between said mobile station and said server.

6. A method comprising:
   requesting a ring tune deck from a media server by entering a Universal Resource Locator (URL) thereof;
   providing a media deck corresponding to said ring tune deck to a mobile station;
   receiving a selection of a category from said media deck;
   providing specific links to ring tunes based on said category selected from said media deck;
   receiving a selection of a ring tune from said specific links to said ring tunes;
   generating a transaction number based on selecting said ring tune and sending a file with said ring tune selected and a reply URL to said mobile station;
   verifying a format of said file and temporarily storing said file within said mobile station;
   providing for a preview of said ring tune on said mobile station;
   generating a primitive including a mobile identification number of the mobile station, the primitive being generated using said reply URL upon acceptance of said ring tune and sending an acceptance message to said media server;

creating a usage record from said acceptance message;

transmitting a confirmation reply message to said mobile station in response to receipt of the primitive at the media server;

permanently storing said ring tune within said mobile station only when permission to save has been received from the media server;

reporting and updating said usage record upon use of said ring tune employing said reply URL; and receiving credit on a bill for compensating the use of said ring tune.

7. The method as recited in claim 6 wherein said URL is selected from a pre-stored list of URLs.

8. The method as recited in claim 6 further comprising viewing a plurality of URLs on a special menu of a display of said mobile station.

9. The method as recited in claim 6 further comprising pressing a selected URL on a special menu of a display of said mobile station to invoke a browser thereof.

10. The method as recited in claim 6 wherein said request includes a header with a mobile identification number of said mobile station.

11. The method as recited in claim 6 wherein a carrier network routes said request to said media server through an Internet via a wireless application protocol gateway.

12. The method as recited in claim 6 wherein said specific link to said ring tunes is shown on a display of said mobile station.

13. The method as recited in claim 6 wherein said selection of said ring tune is performed by scrolling through said specific links to said ring tunes using a scroll key and softkeys or depressing a key of said mobile station.

14. The method as recited in claim 6 wherein said reply URL is programmably generated by said media server.

15. The method as recited in claim 6 wherein said generating said transaction number also includes generating a database record associated with said transaction number.

16. The method as recited in claim 6 wherein said file further includes said transaction number and a label tag.

17. The method as recited in claim 6 further comprising discarding said file, listening to said ring tune or accepting said file following said act of verifying.

18. The method as recited in claim 6 further comprising storing said usage record on a transaction server.

19. The method as recited in claim 6 further comprising providing the credit based on said selection of said ring tune.

20. The method as recited in claim 6 further comprising updating the bill for said mobile station based upon said usage record.

21. An apparatus comprising:
a processor in communication with a memory device and configured to cause the apparatus to perform at least the following:
request a ring tune by sending a message with a header including a mobile identification number of the apparatus;
receive a file including the requested ring tune, a reply Universal Resource Locator (URL) identifying a server, and a transaction identification;
verify a format of said file;
temporarily save the file in the memory device based on the format of said file;
preview the requested ring tune at the apparatus;
send a primitive with the mobile identification number to the server identified by the reply URL upon acceptance of said ring tune;
receive, at the apparatus, permission to save the requested ring tune in response to receipt of the primitive at the server;
permanently save the ring tune within the memory device only when the permission to save has been received from the server;
report and update a usage record created at the server upon use of said ring tune employing said reply URL; and
wherein the use of the ring tune is compensated by receiving credit on a bill.

22. The apparatus of claim 21, wherein the file including the ring tune, the reply URL and the transaction identification conforms to a Multimedia Internet Mail Extension (MIME) format.

23. An apparatus comprising a processor configured to cause the apparatus to:
receive a request from a mobile station for a ring tune deck identified by a Universal Resource Locator (URL) of the ring tune deck;
provide a media deck corresponding to the ring tune deck to the mobile station;
receive a selection of a category from the media deck;
provide specific links to ring tunes based on the received category selection from the media deck;
receive a selection of a ring tune from the specific links to the ring tunes;
generate a transaction number based on the selection of the ring tune and send a file with said ring tune selected and a reply URL to the mobile station;
receive a primitive including a mobile identification number of the mobile station and including the reply URL indicating acceptance of the ring tune by the mobile station following a previewing of said ring tune selected at the mobile station;
create a usage record from the received primitive indicating the acceptance of the ring tune;
transmit a confirmation reply message to the mobile station to thereby grant permission for the mobile station to permanently store the ring tune within the mobile station; and
receive a report and update of the usage record upon use of the ring tune employing the reply URL; and
provide credit on a bill for compensating the use of the ring tune.

24. A method comprising:
receiving a request from a mobile station for a ring tune deck identified by a Universal Resource Locator (URL) of the ring tune deck;
providing a media deck corresponding to the ring tune deck to the mobile station;
receiving a selection of a category from the media deck;
providing specific links to ring tunes based on the received category selection from the media deck;
receiving a selection of a ring tune from the specific links to the ring tunes;
generating a transaction number based on the selection of the ring tune and sending a file with said ring tune selected and a reply URL to the mobile station;
receiving a primitive including a mobile identification number of the mobile station and including the reply URL indicating acceptance of the ring tune by the mobile station following a previewing of the ring tune at the mobile station;

creating a usage record from the received primitive indicating the acceptance of the ring tune;

transmitting a confirmation reply message to the mobile station to thereby grant permission for the mobile station to permanently store the ring tune within the mobile station;

receiving a report and update of the usage record upon use of the ring tune employing the reply URL; and providing credit on a bill for compensating the use of the ring tune.

25. An apparatus comprising:

means for receiving a request from a mobile station for a ring tune deck identified by a Universal Resource Locator (URL) of the ring tune deck;

means for providing a media deck corresponding to the ring tune deck to the mobile station;

means for receiving a selection of a category from the media deck;

means for providing specific links to ring tunes based on the received category selection from the media deck;

means for receiving a selection of a ring tune from the specific links to the ring tunes;

means for generating a transaction number based on the selection of the ring tune and sending a file with said ring tune selected and a reply URL to the mobile station;

means for receiving a primitive including a mobile identification number of the mobile station and including the reply URL indicating acceptance of the ring tune by the mobile station following a previewing of the ring tune at the mobile station;

means for creating a usage record from the received primitive indicating the acceptance of the ring tune;

means for transmitting a confirmation reply message to the mobile station to thereby grant permission for the mobile station to permanently store the ring tune within the mobile station;

means for receiving a report and update of the usage record upon use of the ring tune employing the reply URL; and means for providing credit on a bill for compensating the use of the ring tune.

26. An apparatus comprising:

means for requesting a ring tune by sending a message with a header including a mobile identification number from a mobile station;

means for receiving a file with said ring tune requested, a reply Universal Resource Locator (URL) identifying a server, and a transaction identification at said mobile station;

means for verifying a format of said file;

means for temporarily saving said file within said mobile station based on the format of said file;

means for previewing said ring tune requested on said mobile station;

means for sending a primitive with said mobile identification number from said mobile station to said server identified by said reply URL upon acceptance of said ring tune;

means for receiving permission to save said ring tune requested in response to receipt of the primitive at the server;

means for permanently saving said ring tune within said mobile station only when the permission to save has been received from the server;

means for reporting and updating a usage record created at the server upon use of said ring tune employing said reply URL; and wherein the use of the ring tune is compensated by receiving credit on a bill.

27. The method of claim 1, wherein said receiving the file with said ring tune requested comprising a plurality of content files, at least one content file having a class different from a class of another content file.

* * * * *